3,080,408
PREPARATION OF DIBENZYLTIN DICHLORIDES

Holger Andreas, Otto Klump, and Ilse Menzel, Bensheim, Germany, assignors to Deutsche Advance Produktion G.m.b.H., Bensheim, Germany
No Drawing. Filed Nov. 22, 1960, Ser. No. 84,470
Claims priority, application Germany Nov. 25, 1959
4 Claims. (Cl. 260—429.7)

The invention relates to the preparation of dibenzyltin dichloride and derivatives thereof which are substituted in the benzene nucleus.

Dibenzyltin dichloride and its nuclear substituted derivatives assume increasing importance as starting materials for the preparation of other organotin compounds used as stabilizers for halogen containing resins.

More particularly, the invention relates to a method of preparing dibenzyltin dichloride directly from metallic tin and benzyl chloride in a single step procedure. Instead of benzyl chloride, a benzyl chloride may be used which is substituted in the nucleus, for instance, by halogen, alkyl, or alkoxy groups. These subtituents do not take part in the reaction and remain attached to the benzene nucleus in the end product, which is a correspondingly substituted dibenzyltin dichloride.

The direct reaction of metallic tin with organic halogen compounds has been the subject of many investigations but resulted in very few cases in the formation of organotin compounds. These attempts were successful essentially only with alkyl iodides. The bromides are much less reactive, and the chlorides have been considered as inert. It is for this reason that for the manufacture of diorganotin dichlorides, there has been used the disproportionation method of tetraorganotin with $SnCl_2$ to diorganotin dichloride. For this reaction, the tetraorganotin has to be prepared by the difficult and and costly Grignard or Wurtz methods.

In an application filed October 1, 1959 for the Preparation of Dibenzyltin Dichloride—Serial No. 843,615, was disclosed a direct preparation method in which the entire charge of powdery tin, benzyl chloride, and organic solvent was placed together in the reaction vessel and heated with vigorous stirring. The reaction time was 7 to 9 hours; 38 g. of the tin charge produced 73 g. of dibenzyltin dichloride.

When said process was carried out on a commercial scale, there appeared the following drawback: After termination of the reaction, there remained in the reaction vessel a residue which was difficult to remove and which was essentially unsuitable for further use. Said residue, which consisted of unreacted tin and resinous by-products, adhered as a solid layer to the bottom and walls of the reaction vessel and made cleaning of the vessel very difficult.

We have found that the reaction proceeds considerably faster and in better yields when the organic solvent is first heated with the tin to boiling, and when only then the benzyl chloride is added dropwise to the boiling liquid. A further improvement is obtained when metals, like iron, copper, mercury, gold, platinum, or another metal of the platinum group, or salts thereof, e.g. chlorides, sulfates, nitrates are added in small amounts, for instance 0.01 to 1 g., preferably 0.03 to 0.1 g. per 38 g. of tin.

Suitable organic solvents are, for instance, ethers, esters, ketones, hydrocarbons, chlorinated hydrocarbons, and alcohols; particularly solvents which boil at a temperature of 100 to 150° C. We prefer to use dibutylether, butyl acetate, and toluene.

By our method, the reaction time, which in the above recited method was 7 to 9 hours, could be reduced to 1 hour. Whereas in the procedure of Serial No. 843,615 only 73 g. could be obtained from 38 g. of tin, the yield increases to 89 g. in our novel method.

After termination of the reaction, there remains a powdery residue which is readily removed from the reaction vessel. A charge of 38 g. of tin left a total residue of 4.5 g., compared with a residue of 12 g. of unreacted tin in the method of application Serial No. 843,615.

The following examples illustrate the invention.

Example 1

38 g. of tin flakes were refluxed in 450 g. of dibutyl ether with stirring, and 100 g. of benzyl chloride were dropped into the boiling liquid within about 30 minutes. The batch was then kept boiling for further 30 minutes with stirring. After the reaction was terminated, the clear solution was poured out hot from the powdery gray sediment and the flask was rinsed with some dibutyl ether. On cooling, 78.5 g. of dibenzyltin dichloride crystallized out. Tin content: 30%.

Example 2

Using the same amount of charge and the same dropping-in period, as in Example 1, the total reaction time was increased to 2 hours. There were obtained 89 g. of dibenzyltin dichloride. The powdery residue in the reaction flask weighed 4.5 g. and contained 57.5 percent of tin.

Example 3

With a similar charge and under the same conditions as in Example 1, but with addition of 0.05 g. of copper powder, there were obtained after a reaction time of 1 hour, 82.5 g. of dibenzyltin dichloride.

Example 4

This example was carried out like Example 3 but instead of copper, 0.05 g. of iron powder were added. There was obtained 73.5 g. of dibenzyltin dichloride.

Example 5

If, instead of the iron and tin powder of the preceding examples, a gold foil of 1 g. having a surface of 20 cm.$^2$ was placed into the reaction flask, 82 g. of dibenzyltin dichloride were obtained after a total reaction time of 1 hour.

We claim:
1. A method for the preparation of dibenzyltin dichlorides comprising heating comminuted metallic tin in an organic solvent with stirring, adding a benzyl chloride dropwise slowly to the heated solution, and after termination of the addition of the benzyl chloride, maintaining the solution at reaction temperature with stirring at least for additional thirty minutes.
2. The method as claimed in claim 1 comprising adding to the reaction mixture a metal selected from the group consisting of iron, copper, mercury, gold, and platinum.
3. The method as claimed in claim 2 wherein 0.01 to 1 g. of said metal are added for 38 g. of tin in the reaction mixture.
4. The method as claimed in claim 1 wherein the reaction temperature is about 100 to 150° C.

References Cited in the file of this patent
UNITED STATES PATENTS 2,679,506     Rochow _____ May 25, 1954

FOREIGN PATENTS 469,518     Great Britain _____ July 26, 1937

OTHER REFERENCES

Van der Kerk et al.: Angew. Chem. 70, No. 10, 1958, pp. 298–305, p. 302 relied on.